United States Patent [19]
Reber

[11] Patent Number: 6,123,615
[45] Date of Patent: Sep. 26, 2000

[54] FISH CLEANING APPARATUS AND METHOD OF CLEANING FISH THEREWITH

[76] Inventor: James K. Reber, 10481 NW. 107th Ave., Granger, Iowa 50109

[21] Appl. No.: 09/333,301

[22] Filed: Jun. 15, 1999

[51] Int. Cl.[7] .............................. A22C 25/06; A22C 25/16

[52] U.S. Cl. .......................... 452/161; 452/185; 452/195

[58] Field of Search .................................... 452/161, 185, 452/194, 195, 196

[56] References Cited

U.S. PATENT DOCUMENTS

| | | | |
|---|---|---|---|
| 943,767 | 12/1909 | Bullard | 452/196 |
| 1,228,366 | 5/1917 | Mills | 452/196 |
| 2,583,913 | 1/1952 | Weiterschan | 452/194 |
| 2,825,928 | 3/1958 | Thornton | 452/161 |
| 3,740,794 | 6/1973 | Smith | 452/195 |
| 4,793,027 | 12/1988 | Blight | 452/161 |
| 4,815,169 | 3/1989 | Valleau | 452/161 |
| 5,236,387 | 8/1993 | Simon | 452/194 |

OTHER PUBLICATIONS

Copy—2 pages—showing a Hardwood Crumb Catcher—made by Fox Run Craftsmen.
Copy—3 pages—the front page shows the catalog name as The New Dozier Equipment Co. dated Jan.–Apr. 1998—pp. 68–69 showing several pallets.
Copy—4 pages—the front page shows the catalog name as New Pig—Summer 1997—pp. 16–18 shows pallets with racks.

*Primary Examiner*—Willis Little
*Attorney, Agent, or Firm*—Henderson & Sturm LLP

[57] ABSTRACT

A fish cleaning apparatus having a tray and a compartmentalized fish-supporting structure with hollow compartments therein is disposed above the tray for allowing fish fluids and part to pass therethrough and onto the tray during the fish cleaning process. An insert member is provided on top of the compartmentalized fish supporting structure for facilitating holding of a part of the fish against the top thereof while cutting skin off of a filet of the fish. This insert member has a recessed portion on the top thereof for preventing slippage of the fish with respect to the insert member during the fish cleaning process.

15 Claims, 3 Drawing Sheets

FISH CLEANING APPARATUS AND METHOD OF CLEANING FISH THEREWITH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to an apparatus for cleaning fish and for a method of using it, and more particularly to such an apparatus and method which allows the fish to be securely held and for draining fluids and fish parts into a tray instead of allowing them to accumulate on top of a fish cleaning board.

2. Description of the Related Art

A typical way to clean a fish is to lay the fish on a fish cleaning board and then to use a knife in a conventional fashion while holding the fish with a clamp or by hand or otherwise. One of the main problems with then conventional method is that boards tend to get slimy and slippery during the process as fluids and other parts of the fish accumulate on the surface of the fish cleaning board. This is a problem if only one fish is being cleaned, but the problem is exacerbated if more fish are cleaned using the same board, requiring the board to be rinsed and cleaned often during the process. Consequently, there is a need for a better way to clean fish.

BRIEF SUMMARY OF THE INVENTION

The present invention relates to a fish cleaning apparatus having a tray and a compartmentalized fish-supporting structure with hollow compartments therewith disposed above the tray for allowing fish fluids and fish parts to pass therethrough and onto the tray during the fish cleaning process. An insert member is provided on top of the compartmentalized fish supporting structure for facilitating holding of a part of the fish against the top thereof while cutting the skin from the fillet of the fish. This insert member has a recessed portion on the top thereof for preventing slippage of the fish with respect to the insert member during the fish cleaning process.

To use the aforementioned apparatus, a fish is placed on the supporting structure and the filet is cut off of the fish, allowing fluid from the fish to pass through the compartments to the tray. The filet is removed from the fish while holding the head with one hand and cutting the filet off with a knife in the other hand, allowing fluids and fish parts to fall through the supporting surface into the tray below. This step is repeated until the filets are removed from both sides of the fish. Then the fish carcass is discarded. While holding the filet (with skin and rib bones still attached), using the holding tool behind rib bones pressed against the supporting surface, the rib bones are removed by placing the knife between the rib bones and the flesh. These steps are repeated for both filets. To remove the skin from the filet (FIG. 1), the small portion of the tail end of the filet is pressed into the slot in the insert with the holding tool. Then the knife is placed between the skin of the flesh and the flesh is sliced from the skin. These steps are repeated for both filets and the skin is discarded. This process is repeated until both filets are removed from the fish.

An object of the present invention is to provide an improved fish cleaning apparatus and method of cleaning fish therewith.

Another object of the present invention is to provide a fish cleaning apparatus which allows the fluids and some parts of the fish to drain through a compartmentalized fish-supporting structure so that they will not accumulate on top of the fish supporting structure during the cleaning process.

Another object of the present invention is to keep the "slime" on the fish instead of transferring it to a fish cleaning board, something which is accomplished by using a compartmentalized, hollow fish supporting structure instead of a solid fish cleaning board.

A still further object of the present invention is to provide an insert member which can be used to help hold a filet being supported on the fish supporting structure.

A still further object of the present invention is to provide an elongated holding tool for allowing someone cleaning a filet to hold it with one hand and push against a part of the fish to hold it between the elongated member and the insert.

A still further object of the present invention is to provide an insert with a depression thereon for facilitating the holding of a fish filet thereagainst.

Other objects, advantages, and novel features of the present invention will become apparent from the following detailed description of the invention when considered in conjunction with the accompanying drawings.

DETAILED DESCRIPTION OF THE INVENTION

Figure 1:
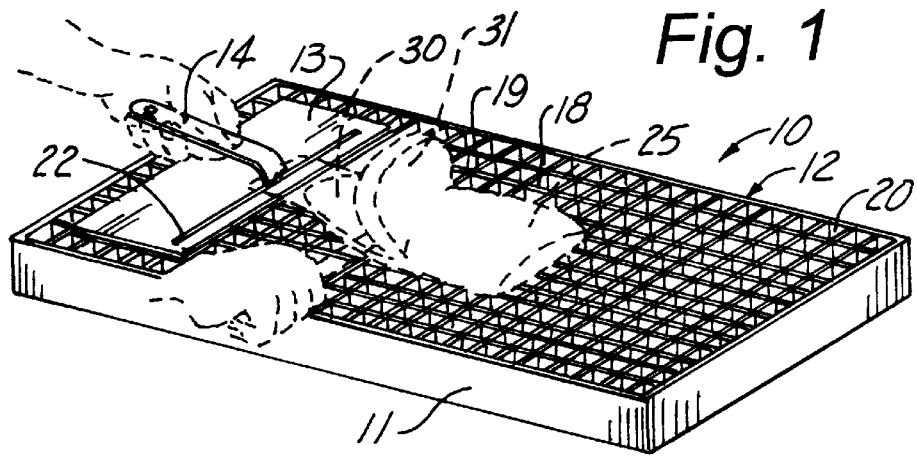
FIG. 1 is perspective view of the apparatus of the present invention in solid lines and showing how it is used to remove the skin of a fish from a filet (shown in dashed lines)
Figure 2:
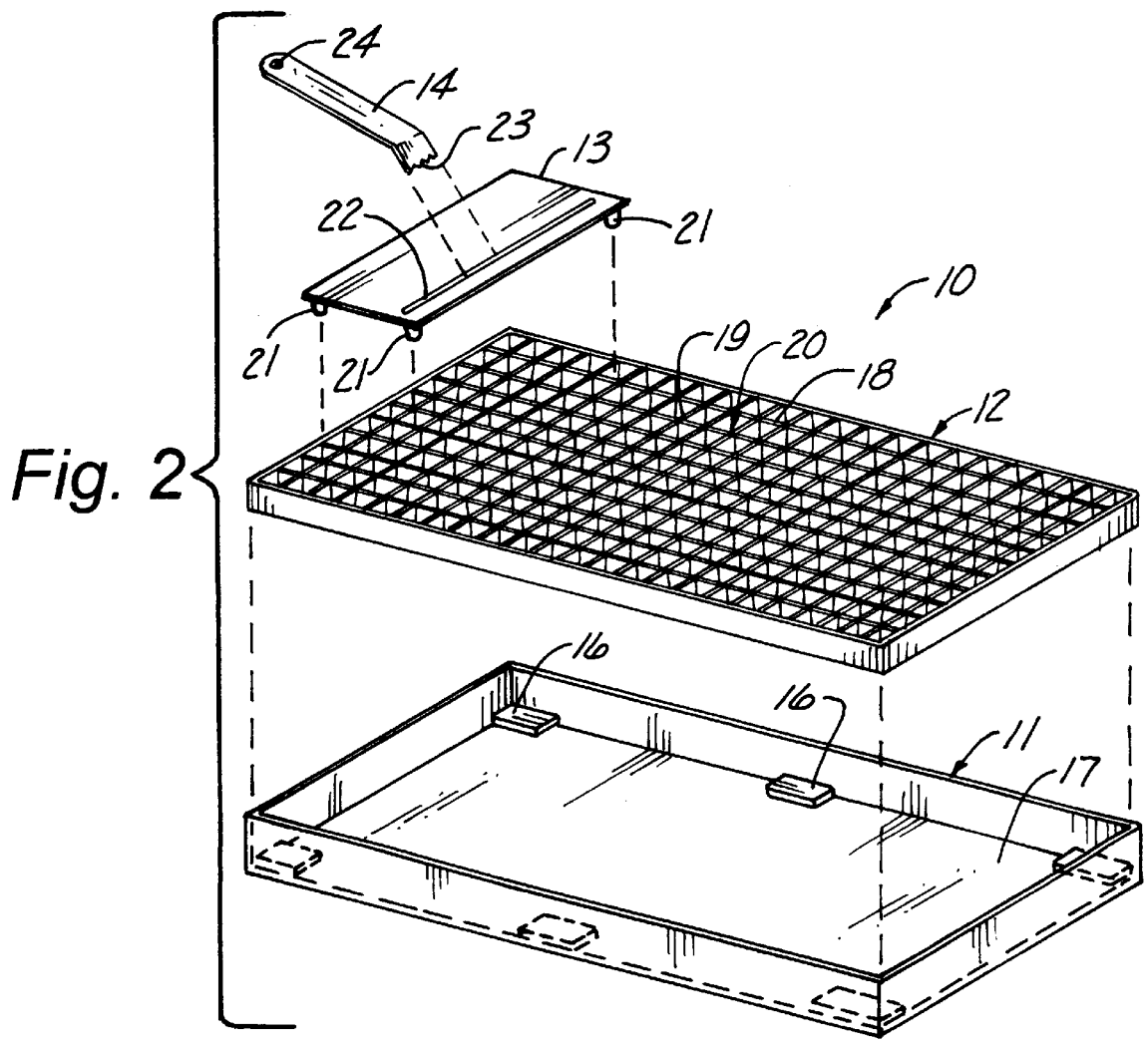
FIG. 2 is a perspective exploded view of the parts of the present invention.

Referring now to the drawings, wherein like reference numerals designate identical or corresponding parts throughout the several views, FIG. 1 shows the present invention (10) being used to clean a fish. Referring now to FIG. 2, a tray (11) has a grid for compartmentalized fish supporting structure (12) which fits in the tray (11) and an insert member (13). An elongated holding tool (14) completes the four basic parts of the invention, although the invention (10) is useful without use of the elongated holding tool (14) and without the use of the insert member (13).

Referring in more detail to the tray (11), it is noted that it has a plurality of spacers (16) in the bottom thereof for holding the compartmentalized fish supporting structure (12) above the bottom (17) of the tray (11). While the tray (11) is shown in its preferred form, it could have a drain hole (not shown) in the bottom or on the side for automatically transferring fluids therefrom if desired. The tray (11) can be formed of many different materials such as plastic or wood and preferably is injection molded from a plastic such as nylon.

Referring now again to FIG. 2, the compartmentalized fish supporting grid (12) has a plurality of longitudinal walls (18) and a plurality of transverse walls (19) which, with the walls (18) form square compartments (20). This structure can be made from a diffuser for diffusing air or light of the type which is available at building supply stores or it can be manufactured specifically for this product. The grid (12) can be of any shape that produces compartments. For example, the compartments could be circular or diamond-shaped or perhaps rectangular by leaving out either the longitudinal ribs (18) or the lateral ribs (19), thereby forming long slot-like compartments across the grid (12). Preferably, these ribs (18) and (19) are quite thin because the idea is to support the fish without having very much surface area of the grid touching the fish. In the preferred embodiment, only about 15% of the top surface of the fish supporting structure is present to contact the fish, compared to one hundred percent (100%) when a solid cleaning board is used. This keeps the slime on the fish where it belongs instead of on the board or fish supporting grid (12), since having it on the fish cleaning board or grid (12) causes problems.

Referring now to the insert member (13) shown in FIGS. 1–5 and 7, this insert member (13) can be made of a hard plastic material such as LEXAN® or of other suitable materials. The insert member (13) has a plurality of projections (21) on the bottom thereof for being received in the openings (20) in the grid (12). A depression (22) in the top of the grid (13), in its preferred form, is actually a slot (22) extending all the way through the insert member (13).

The projections (21) can be formed in one piece with the insert member (13), for example by injection molding or they can be attached thereto with screws or bolts and can be of the same or different material than that of the flat portion (13) of the insert member (13). For example, the projections (21) could be made of aluminum or stainless steel or other metals or a plastic like nylon or whatever material the rest of the insert member (13) is constructed. The elongated holding member (14) is bent downwardly on one end thereof and has the serrated portion (23) which facilitates better holding of the fish part being held against the insert member (13). A hole (24) can be disposed in the other end of the fish holding tool (14) for hanging it up or the like.

Figure 3:
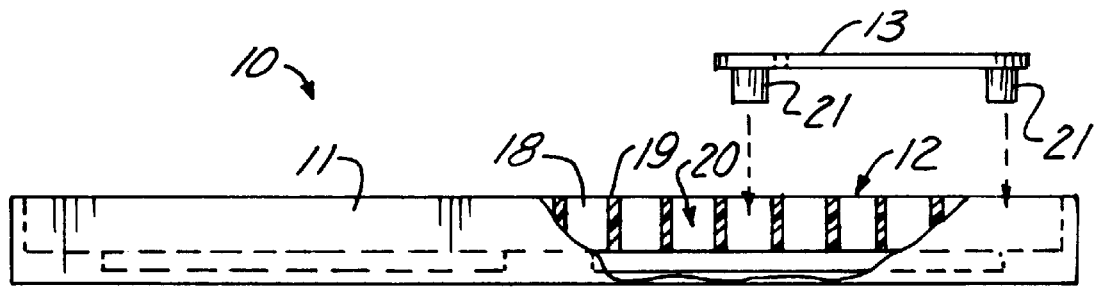
FIG. 3 is a side elevational view of the present invention with a portion of a tray cut away and a portion of the fish supporting surface cut away to show how the insert member fits into the compartmentalized fish supporting structure.

The process of using the apparatus (10) for cleaning fish starts with the step of inserting the insert (13) in FIG. 3 in a desired location on the supporting structure (12). This location can vary, depending upon the size of the fish being cleaned. For example, when a large fish is being cleaned, such as that shown in FIG. 4, the insert member (13) would be at one end so that the entire fish can lay on the fish supporting grid (12). If smaller fish are being cleaned, the insert (13) might be placed on an intermediate portion of the grid (12) so that one side of the grid could be a fish staging area where several small fish could be placed on the space on grid (12) and the other side of the insert (13) could be used for cleaning fish.

Figure 4:
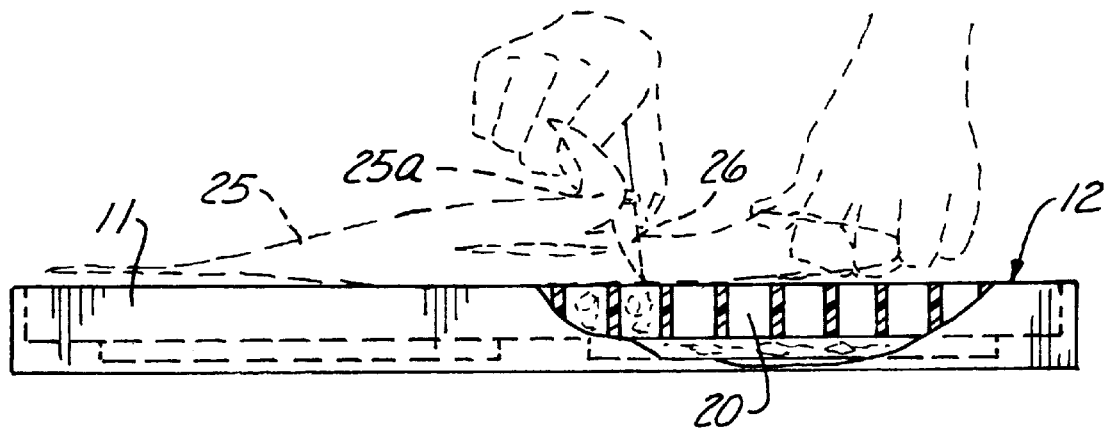
FIG. 4 is a view similar to FIG. 3, but showing in dashed lines how the beginning processes of cleaning a fish by removing a filet, including the ribs and skin, from one side of a fish.

After the insert (13) has been placed, for example, to the position shown in FIGS. 3 and 4, the fish (25) is laid on top of the supporting surface (13) as shown in FIG. 4. The filet (25a) is removed from the fish while holding the head with one hand and cutting the filet off with a knife (26) in the other hand, allowing fluids and fish parts to fall through the supporting surface (12) into the tray (11) below. This step is repeated until the filets (25a) are removed from both sides of the fish. Then the fish carcass is discarded.

Figure 5:
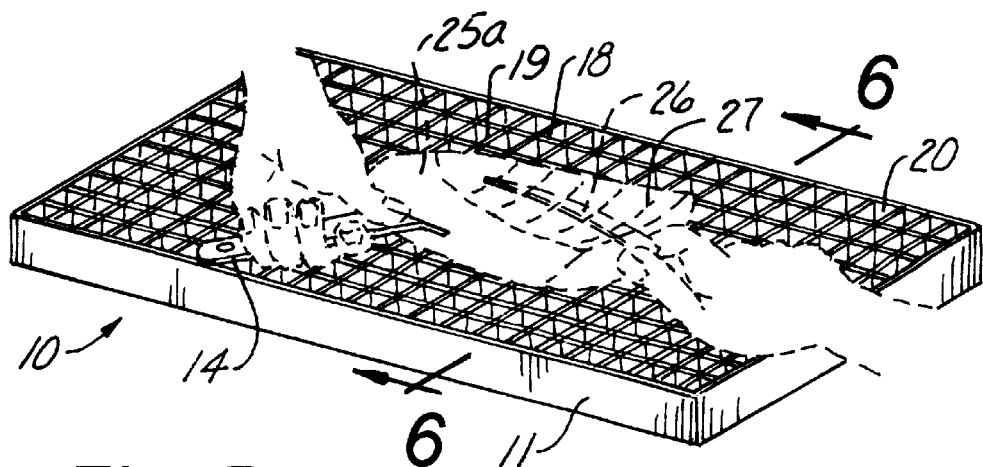
FIG. 5 is a view similar to FIG. 4, but showing how the ribs of the filet are removed using an elongated tool and a knife.
Figure 6:
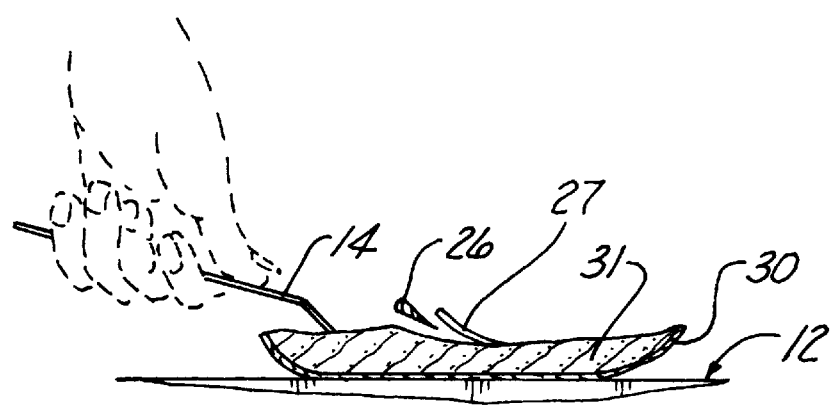
FIG. 6 is a cross-sectional view taken along line 6—6 of FIG. 5 showing the ribs being cut from the filet while the filet, with the skin on, is being held with an elongated tool.

While holding filet (25a) with the skin (30) and rib bones (27) still attached, as shown in FIGS. 5 and 6 using the holding tool (14) behind rib bones (27) pressed against supporting surface, the rib bones (27) are removed by placing the knife (26) between the rib bones (27) and the flesh (31). These steps are repeated for both filets (25a).

Figure 7:
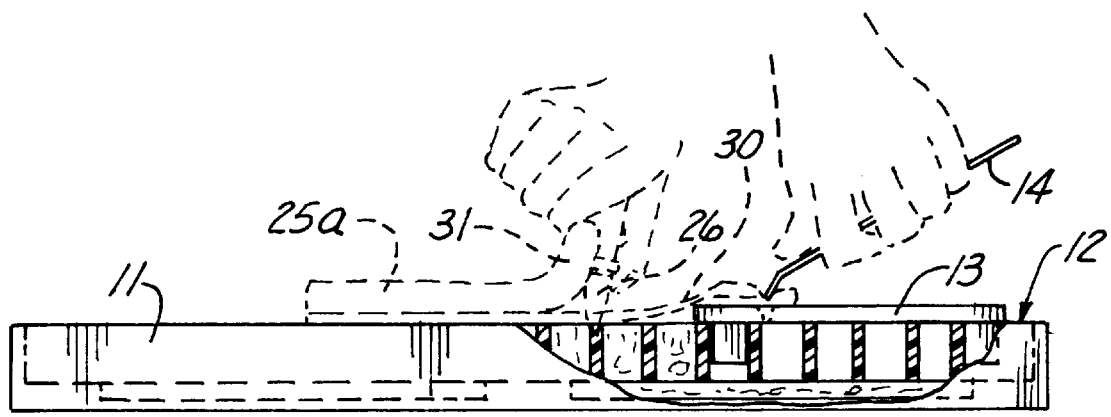
FIG. 7 is a view like FIG. 3 but showing the skin being cut off of the filet with a knife while the skin in being held in the slot by the holding tool.
Figure 8:
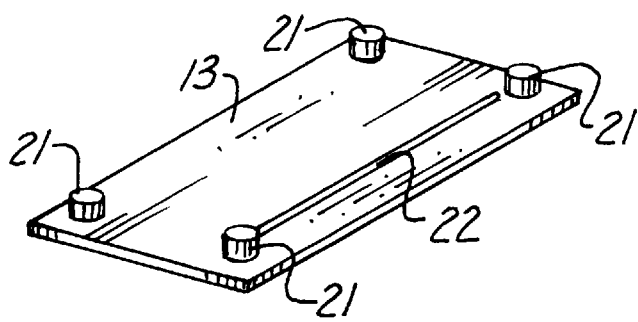
FIG. 8 is a view of the bottom of the insert member showing projections thereon and a slot.
Figure 9:
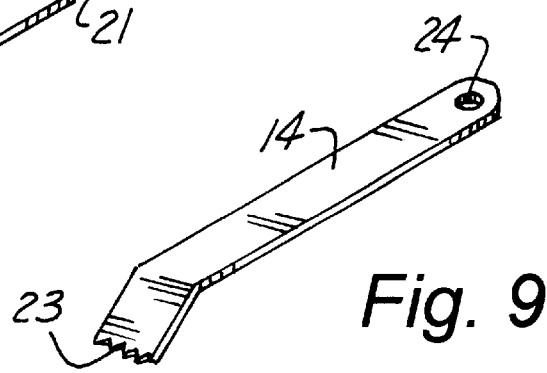
FIG. 9 is an elongated tool with serrations at one end for holding a fish part and having a hole in the other end for allowing it to be hung up for storage.

Referring to FIG. 7, to remove the skin (30) from filet (25a), the small portion of the tail end of the filet (25a) is pressed into the slot (22) in the insert (13) with the holding tool (14). Then the knife (26) is placed between the skin (30) and the flesh (31) and the flesh (31) is sliced from the skin (30). These steps are repeated for both filets (25a) and then the skin (30) is discarded.

It is noted that when the fish is cut open, it is wet and bloody, on a normal flat, solid cleaning board these fluids can contaminate the meat. However, using the present invention, anything that does come off of the fish goes through the grid and into the tray. Furthermore, the parts of the present invention are essentially dishwasher safe, meaning that essentially they can be hosed off and then placed in the dishwasher. Additionally, the grid (12) could be retrofit on top of a table or the like instead of having a tray (11), although some sort of a tray associated with the table would be preferred.

Obviously many modifications and variations of the present invention are possible in light of the above teachings. It is therefore to be understood that, within the scope of the appended claims, the invention may be practiced otherwise than as specifically desired.

I claim:

1. A fish cleaning apparatus comprising:
   a tray having a top;
   a compartmentalized fish supporting structure having hollow compartments disposed above said tray for allowing fish fluids and parts to pass therethrough and onto said tray, said supporting structure having a top and a bottom; and
   an insert member having a top and a bottom and being disposed on top the supporting structure for facilitating the holding of part of a fish against the top thereof, said insert member having a recessed portion on the top thereof for preventing slippage of the fish part with respect to the insert member during a fish cleaning process.

2. The fish cleaning apparatus of claim 1 including at least one projection extending downwardly from the bottom of the insert member and extending into at least one of said compartments for holding the insert member with respect to the supporting structure.

3. The fish cleaning apparatus of claim 1 wherein said supporting structure comprises a grid, said grid comprising a plurality of first members which extend in one direction, said first members having a length, a height and a width, second members intersecting said first members extending in a second direction, said second members also having a length, a height and a width with spaces being formed between adjacent members for allowing parts of the fish to flow therethrough.

4. The fish cleaning apparatus of claim 3 wherein the compartments of the grid comprise a parallelogram.

5. The fish cleaning apparatus of claim 3 wherein said parallelogram is a square.

6. The fish cleaning apparatus of claim 1 wherein said compartmentalized fish supporting structure is made of plastic.

7. The fish cleaning apparatus of claim 2 wherein said insert member has a plurality of projections for selectively holding the insert from moving with respect to the supporting structure.

8. The fish cleaning apparatus of claim 7 including means for permitting said insert member to be selectively secured at multiple places on said supporting structure.

9. The fish cleaning apparatus of claim 1 including an elongated holding tool for selectively pushing a part thereon against a part of a fish on the insert member.

10. The fish cleaning apparatus of claim 9 wherein one end of said holding tool is serrated.

11. The fish cleaning apparatus of claim 1 wherein said recessed portion includes a slot extending through said insert member.

12. The apparatus of claim 1 including means for spacing the bottom of the compartmentalized fish supporting structure above the top of the tray.

13. A method of cleaning a fish using a tray; a compartmentalized fish supporting structure having hollow compartments for allowing fish fluids and parts to pass therethrough; and an insert member having a top and a bottom and being disposed on top the supporting structure for facilitating the holding of part of a fish against the top thereof, said insert member having a recessed portion on the top thereof for preventing slippage of the fish part with respect to the insert member during a cleaning process, said method comprising:

(a) placing a fish on said supporting structure;

(b) holding one end of a portion of the fish with one hand while using a knife with the other hand to cut a piece of flesh away from the bones of the fish.

14. The method of claim 13 including turning the fish over on said supporting structure and repeating step (b).

15. A method of removing the skin of a fish filet using a tray; a compartmentalized supporting structure having hollow compartments for allowing fish fluids and parts to pass therethrough; and an insert member having a top and a bottom and being disposed on top the supporting structure for facilitating the holding of said fish filet against the top thereof, said insert member having a recessed portion on the top thereof for preventing slippage of the fish filet with respect to the insert member during a cleaning process, said method comprising:

(a) placing said fish filet with the skin thereon on said supporting structure;

(b) holding one end of the skin with one hand by using an elongated holding tool against the recessed portion of the insert member while using a knife with the other hand to cut the skin away from the flesh of the filet.

* * * * *